United States Patent
Takahama (10) Patent No.: US 10,173,589 B2
(45) Date of Patent: Jan. 8, 2019

(54) CUP HOLDER

(71) Applicant: CALSONIC KANSEI CORPORATION, Saitama (JP)

(72) Inventor: Yoshihide Takahama, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/314,396

(22) PCT Filed: May 21, 2015

(86) PCT No.: PCT/JP2015/064549
§ 371 (c)(1),
(2) Date: Nov. 28, 2016

(87) PCT Pub. No.: WO2015/182464
PCT Pub. Date: Dec. 3, 2015

(65) Prior Publication Data
US 2017/0182937 A1    Jun. 29, 2017

(30) Foreign Application Priority Data

May 28, 2014  (JP) ................. 2014-110567

(51) Int. Cl.
*B60Q 3/00* (2017.01)
*B60Q 3/64* (2017.01)
(Continued)

(52) U.S. Cl.
CPC ............ *B60Q 3/64* (2017.02); *B60N 3/10* (2013.01); *B60N 3/101* (2013.01); *B60Q 3/20* (2017.02)

(58) Field of Classification Search
CPC ................................................ A47G 23/0309
See application file for complete search history.

(56) References Cited

U.S. PATENT DOCUMENTS

| 8,960,944 B2 * | 2/2015 | Foo ............... A47G 23/0216 |
| | | 362/154 |
| 2009/0045309 A1 * | 2/2009 | Kikuchi ............... B60N 3/101 |
| | | 248/311.2 |

(Continued)

FOREIGN PATENT DOCUMENTS

| CN | 102811885 A | 12/2012 |
| JP | 2007-203800 A | 8/2007 |

(Continued)

OTHER PUBLICATIONS

International Search Report and Written Opinion of the International Search Report for PCT/JP2015/064549 dated Jul. 21, 2015.

*Primary Examiner* — Andrew Coughlin
(74) *Attorney, Agent, or Firm* — Kenealy Vaidya LLP (57) ABSTRACT

A cup holder includes a cup holder body which has a bottomed container shape and is capable of accommodating a beverage container; a decorative finisher member which is installed in an upper edge portion of the cup holder body; a light guide member which is interposed between a lower portion of the finisher member and an upper edge portion of the cup holder body. A light-guide-member installation part and a finisher-member fixing part are provided in the cup holder body. The finisher-member fixing part fixes the finisher member to the cup holder body in a state where the finisher member is separated with a gap part from an upper side of the light guide member.

3 Claims, 5 Drawing Sheets

(51) Int. Cl.
 *B60N 3/10* (2006.01)
 *B60Q 3/20* (2017.01)

(56) References Cited

U.S. PATENT DOCUMENTS

| | | | | |
|---|---|---|---|---|
| 2011/0261579 A1* | 10/2011 | Anderson | ............... | B60N 3/108 362/551 |
| 2012/0075842 A1* | 3/2012 | Goto | ....................... | B60N 3/101 362/154 |
| 2015/0175046 A1* | 6/2015 | Oh | ......................... | B60N 3/104 62/3.3 |
| 2015/0191116 A1* | 7/2015 | Forrest | ................... | B60N 3/101 362/516 |
| 2015/0291090 A1 | 10/2015 | Koizumi et al. | | |
| 2016/0039324 A1* | 2/2016 | Muiter | ................... | B60N 3/108 362/253 |

FOREIGN PATENT DOCUMENTS

| | | |
|---|---|---|
| JP | 2013-518770 A | 5/2013 |
| JP | 2014-100980 A | 6/2014 |
| JP | 2015-120472 A | 7/2015 |
| WO | 2012/039746 A1 | 3/2012 |
| WO | 2014/077388 A1 | 5/2014 |

\* cited by examiner

SECT A-A

SECT B-B

CUP HOLDER

This application is a U.S. national phase filing under 35 U.S.C. § 371 of PCT Application No. PCT/JP2015/064549, filed on May 21, 2015, and claims priority under 35 U.S.C. § 119 to Japanese patent application number JP2014-110567 filed on May 28, 2014, the entireties of which are incorporated herein by reference.

TECHNICAL FIELD

The present invention relates to a cup holder.

BACKGROUND ART

A vehicle such as an automobile is provided with a cup holder at various positions in a cabin (for example, see Patent Document 1).

Some of such cup holders include a cup holder body which has a bottomed container shape and can accommodate a beverage container, and a decorative finisher member provided in the upper edge portion of the cup holder body.

A light guide member is mounted in a state of being clamped between the lower portion of the finisher member and the upper edge portion of the cup holder body. Light from a light source is guided to the light guide member to illuminate the interior of the cup holder body.

RELATED DOCUMENTS

Patent Documents

Patent Document 1: JP-A-2007-203800

SUMMARY OF THE INVENTION

Problems That the Invention is to Solve

However, in the cup holder, the light guide member is mounted in a state of being clamped between the lower portion of the finisher member and the upper edge portion of the cup holder body. Thus, when external force from above acts on the finisher member, the above-described external force is directly transmitted to the light guide member. Therefore, there is a risk that the light guide member is broken.

In this regard, a main object of the present invention is to solve the above problem.

Means for Solving the Problems

In order to solve the above problem, the present invention is to provide a cup holder including: a cup holder body which has a bottomed container shape and is capable of accommodating a beverage container; a decorative finisher member which is installed in an upper edge portion of the cup holder body; and a light guide member which is interposed between a lower portion of the finisher member and an upper edge portion of the cup holder body and is capable of illuminating an interior of the cup holder body with light from a light source, in which a light-guide-member installation part in which the light guide member is installable, and a finisher-member fixing part to which the finisher member is fixable are provided in the cup holder body, and the finisher-member fixing part fixes the finisher member to the cup holder body in a state where the finisher member is separated with a gap part from an upper side of the light guide member.

Advantages of the Invention

With the above configuration of the present invention, it is possible to prevent breakage of the light guide member due to the external force.

MODES FOR CARRYING OUT THE INVENTION

Hereinafter, this embodiment will be described in detail with reference to the drawings.

FIGS. 1 to 7 illustrate this embodiment.

First Example

<Configuration>

Hereinafter, the configuration of the example will be described.

Figure 1:
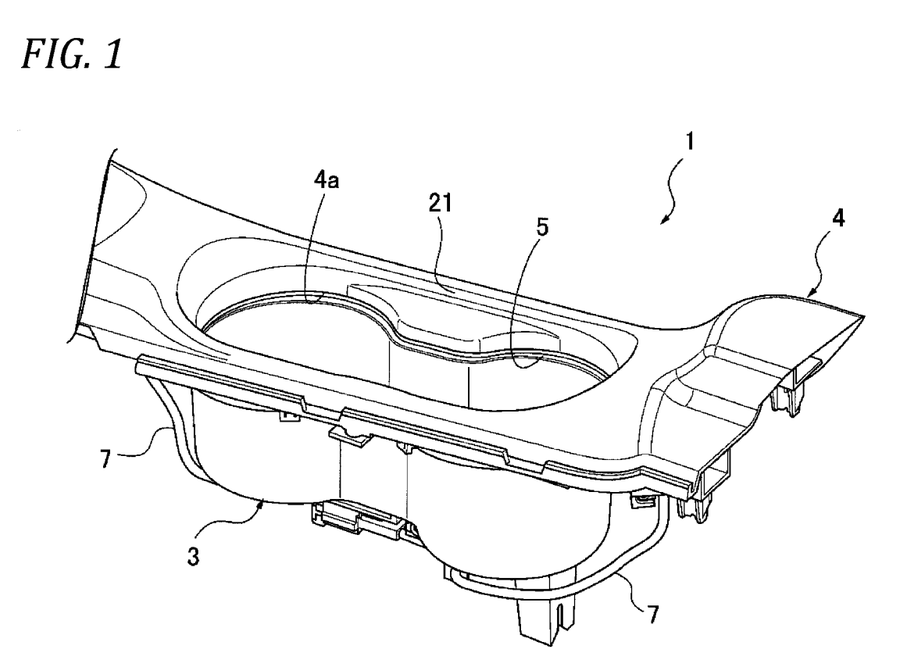
FIG. 1 is an overall perspective view of a cup holder according to an example of this embodiment.

A vehicle such as an automobile is provided with a cup holder 1, which is, for example, illustrated in a perspective view of FIG. 1, at various positions in a cabin. The cup holder 1 is provided, for example, in a center console provided between a driver seat and a passenger seat.

Figure 2:
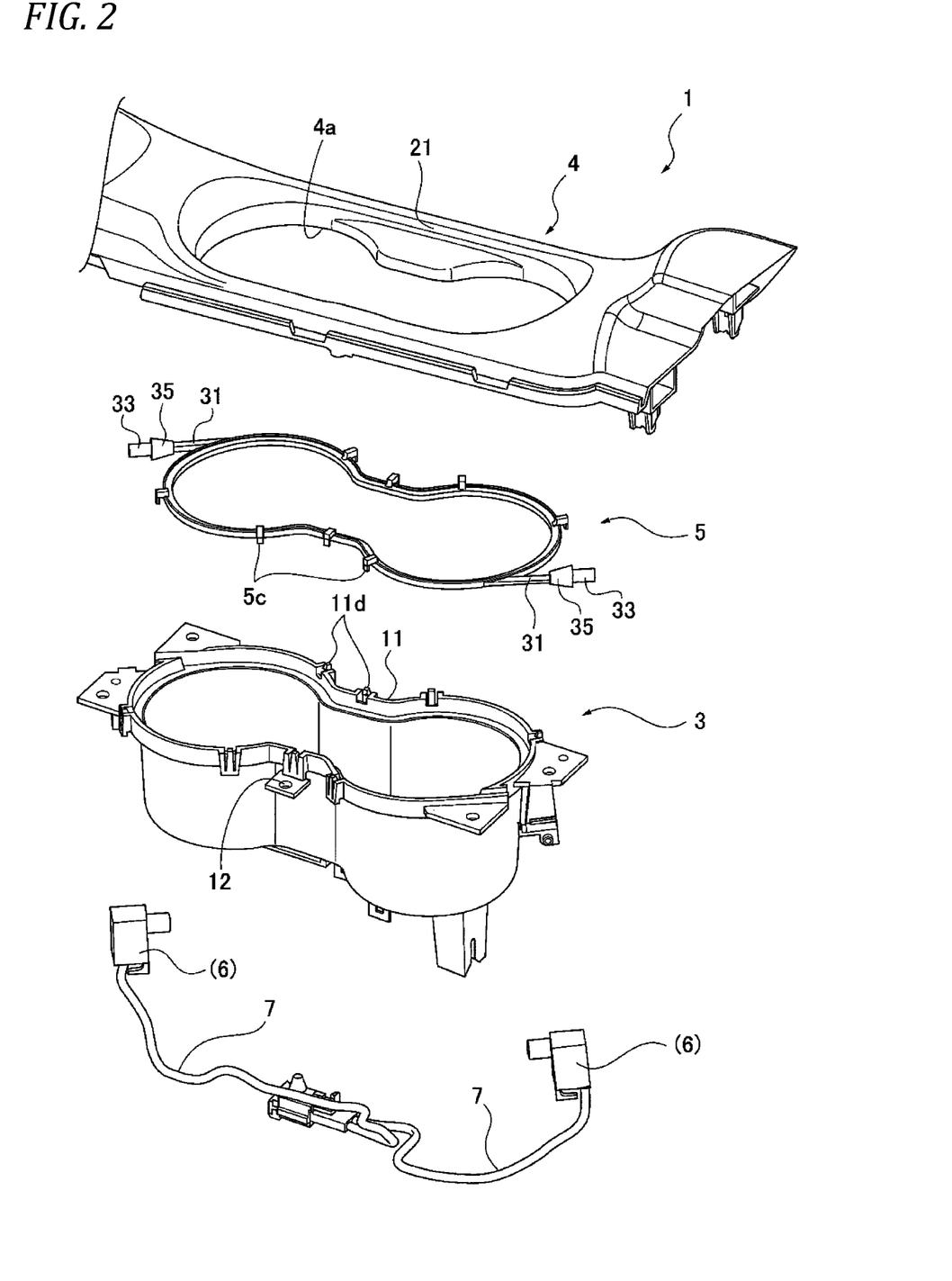
FIG. 2 is an exploded perspective view of the cup holder of FIG. 1.

As illustrated in an exploded perspective view of FIG. 2, the cup holder 1 includes a cup holder body 3 which has a bottomed container shape and can accommodate a beverage container, and a decorative finisher member 4 provided in the upper edge portion of the cup holder body 3.

A light guide member 5 is interposed between the lower portion of the finisher member 4 and the upper edge portion of the cup holder body 3. Light from a light source 6 is guided to the light guide member 5 to illuminate the interior of the cup holder body 3.

Figure 3:
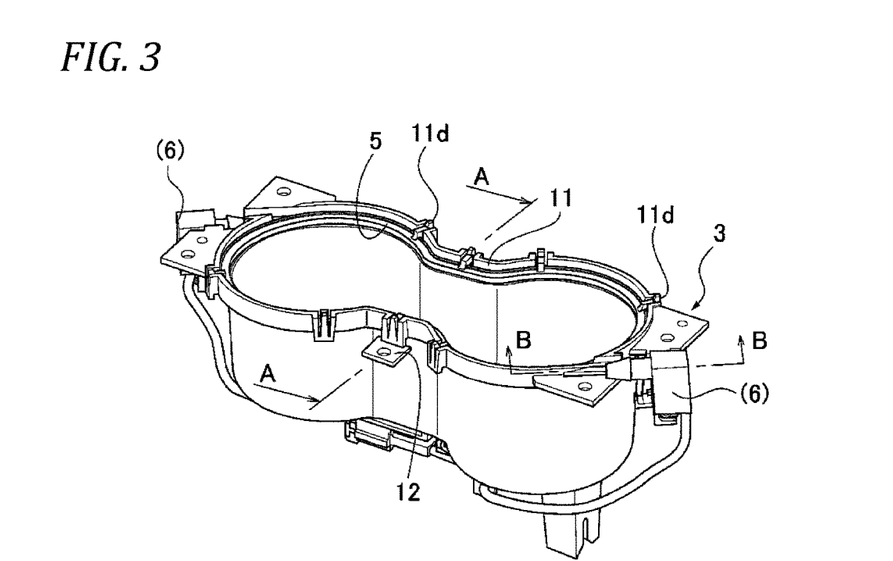
FIG. 3 is a perspective view of a cup holder body of FIG. 2.

Herein, the cup holder body 3 has, for example, a continuous double shape (see also a single article drawing of FIG. 3). However, the cup holder body 3 is not limited to the continuous double shape. An opening part 4a, which has an almost ∞ shape in plan view in correspondence to the shape of the upper edge portion of the cup holder body 3, is formed in the finisher member 4. The light guide member 5 has an almost 8-shaped plan shape in accordance with the shape of the upper edge portion of the cup holder body 3. The light guide member 5 is formed of transparent acrylic resin or polycarbonate resin. The light source 6 is an LED and the like. A harness 7 for supplying electrical power is connected to the light source 6.

As for the above basic configuration, this example has a following configuration.

Figure 4:
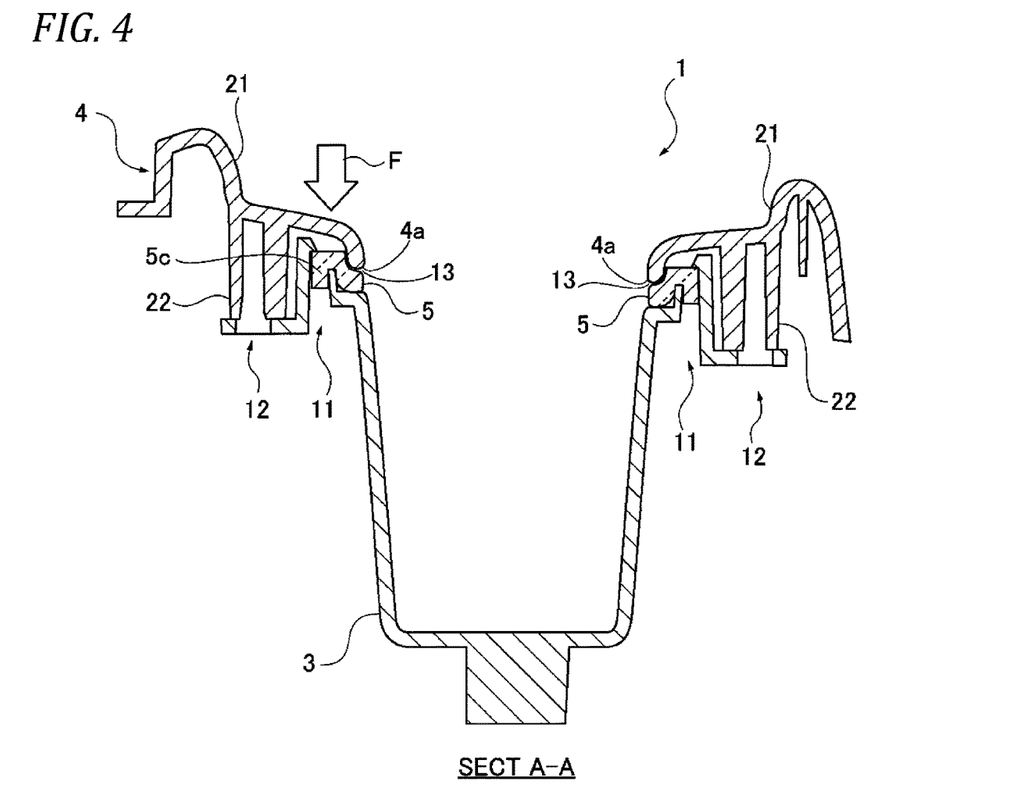
FIG. 4 is a longitudinal sectional view of the intermediate portion of FIG. 3 (a sectional view taken along line A-A).

(1) As illustrated in a longitudinal sectional view of FIG. 4 (and a partially enlarged sectional view of FIG. 5), a light-guide-member installation part 11 in which the light guide member 5 is installable, and a finisher-member fixing part 12 to which the finisher member 4 is fixable are provided in the cup holder body 3.

Figure 5:
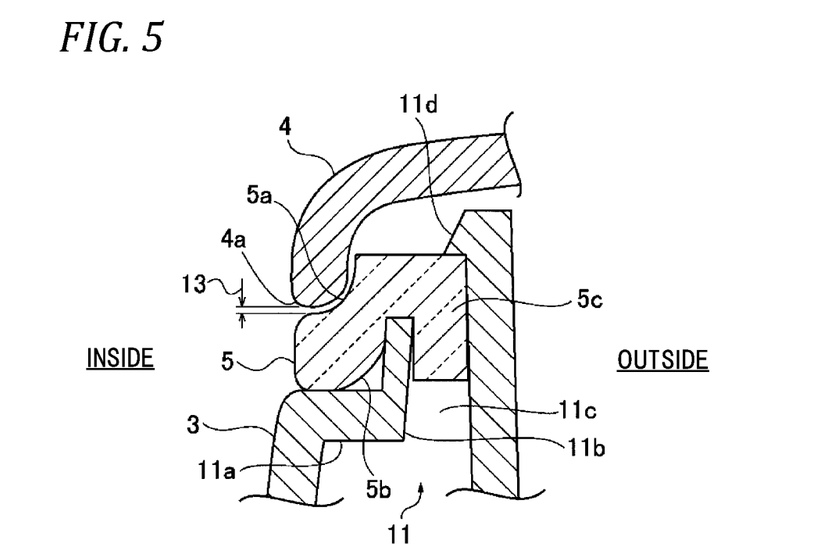
FIG. 5 is a partially enlarged sectional view of FIG. 4.

The finisher-member fixing part 12 fixes the finisher member to the cup holder body 3 in a state where the finisher member 4 is separated with a gap part 13 from the upper side of the light guide member 5.

Herein, the light-guide-member installation part 11 includes a flange part 11a which is provided in the upper edge portion of the cup holder body 3 and widens in a lateral direction, and a rising part 11b which stands upward from the outer peripheral edge of the flange part 11a. The flange part 11a serves as a mounting seat surface which supports the bottom surface of the light guide member 5 and a vertical positioning part.

The rising part 11b serves as a lateral positioning part which positions the light guide member 5 in the lateral direction. The outside of the rising part 11b is formed to have fitting parts 11c, into which the outer surface of the light guide member 5 is fitted, in a plurality of positions along the upper edge portion of the cup holder body 3, and locking claws 11d, which can lock the outer upper portion of the light guide member 5, with a necessary gap interposed therebetween.

The locking claw 11d clamps and holds the light guide member 5 vertically between the locking claw 11d and the flange part 11a. With such a structure, the cup holder body 3 can independently support and fix the light guide member 5. The light guide member 5 is not mounted to the finisher member 4.

With respect thereto, the light guide member 5 is installed along the upper surface of the flange part 11a and the inner surface of the rising part 11b in the upper edge portion of the cup holder body 3. A concave 5a which has the substantially same shape as the tip shape of the edge portion of the opening part 4a of the finisher member 4 is formed in the top portion of the light guide member 5 on the inner peripheral surface side. In the bottom of the light guide member 5 on the outer peripheral side, a round part 5b for preventing the edge shape corresponding to a corner portion formed by the flange part 11a and the rising part 11b from being seen from the outside is formed as anti-see-through part.

A fitting locking part 5c which extends to the back side of the rising part 11b across the rising part 11b, is fitted to the fitting part 11c, and is locked by the locking claw 11d is integrally formed in a portion, which is provided with the fitting part 11c and the locking claw 11d, of the light guide member 5.

The finisher-member fixing part 12 includes a mounting hole for fixing the finisher member 4 from a lower side with a screw. A plurality of the finisher-member fixing parts 12 are provided in positions outer from the light-guide-member installation part 11. The mounting hole of the finisher-member fixing part 12 is provided with respect to a protruding piece which is integrally formed outward from the vicinity of the upper edge portion of the cup holder body 3.

The gap part 13 is formed between the edge portion of the opening part 4a of the finisher member 4, and the concave 5a of the light guide member 5 on the inner peripheral surface side.

(2) A rising part 21 standing upward is provided on the peripheral side, which is outer from a portion covering the light guide member 5, of the finisher member 4.

A fixing boss part 22 is provided with respect to the finisher-member fixing part 12 on the inside of the rising part 21.

Herein, the rising part 21 may be formed, for example, as a steep slope surface or the like which has a larger angle than 45°. The rising part 21 is provided in the entire periphery of the opening part 4a of the finisher member 4. The inside of the rising part 21 indicates the central side of the cup holder body 3. The fixing boss part 22 is positioned between the rising part 21 and the light guide member 5.

Figure 6:
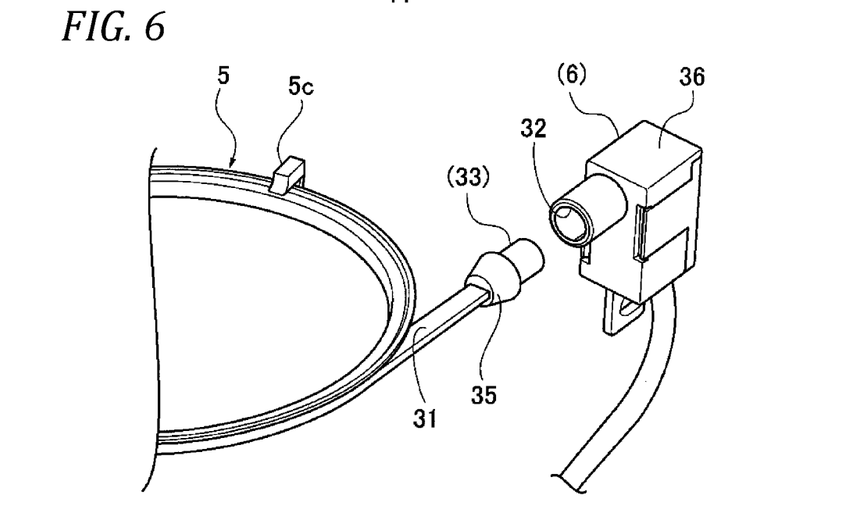
FIG. 6 is an enlarged perspective view of the vicinity of a light-incident part of a light guide member.

(3) As illustrated in FIG. 6, a light-incident part 31 to which the light is incident from the light source 6 protrudes from the light guide member 5.

The light-incident part 31 serves as an insertion end part 33 which is insertable to an emission hole part 32 to which the light from the light source 6 is emitted.

Figure 7:
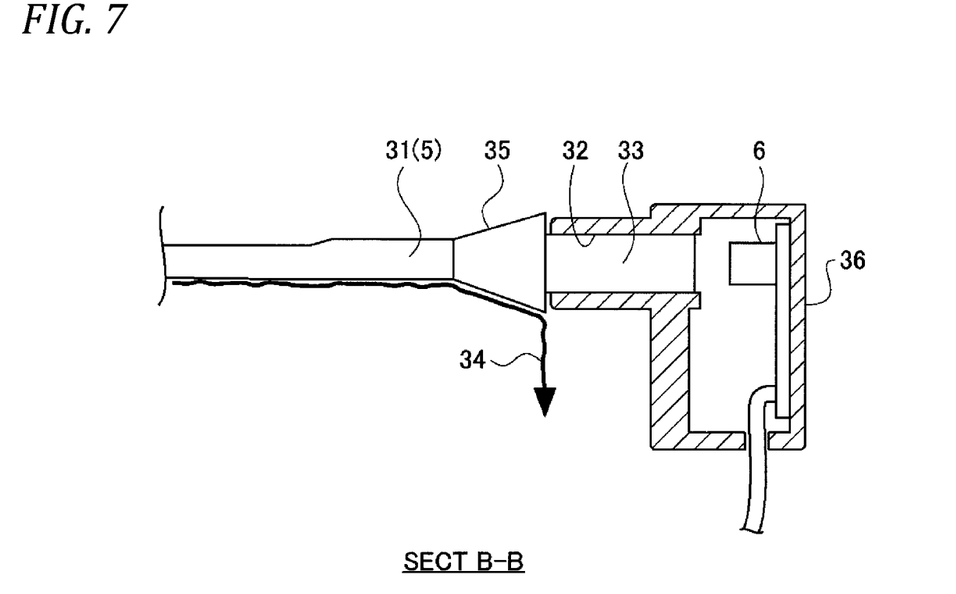
FIG. 7 is a longitudinal sectional view of the vicinity of an insertion end part of the light-incident part of FIG. 6 (or a sectional view taken along line B-B of FIG. 3).

As illustrated in FIG. 7, a penetration-preventing enlarged-diameter part 35 which can prevent the penetration of liquid 34 to the emission hole part 32 is provided in the vicinity of the insertion end part 33.

Herein, the light-incident part 31 protrudes in a tangential direction from the light guide member 5 which has a circular shape or an overlapped-circular shape (∞ shape in the case). The emission hole part 32 is provided in a light source holder 36 which accommodates the light source 6. The emission hole part 32 is formed to have a short-tubular shape. The liquid 34 is assumed as beverage overflowing from the beverage container or rain water penetrating from outside. The penetration-preventing enlarged-diameter part 35 may be formed in a flange shape, but in this case, the penetration-preventing enlarged-diameter part 35 has a conical shape of which the diameter is enlarged toward the emission hole part 32.

<Effects>

With this example, it is possible to obtain following effects.

(1) With respect to the cup holder body 3 having a bottomed container shape, it is possible to accommodate the beverage container by inserting the beverage container from the upper side.

By guiding the light from the light source 6 to the light guide member 5, it is possible to illuminate, in a transverse shape, the portion between the upper edge portion of the cup holder body 3 and the lower portion of the decorative finisher member 4 inside the cup holder 1.

At that time, the light guide member 5 is installed (locked and held in an installed state) in (the upper edge portion of) the cup holder body 3 through the light-guide-member installation part 11. The finisher member 4 is fixed to the cup holder body 3 through the finisher-member fixing part 12. Accordingly, a holding structure is obtained in which the finisher member 4 and the light guide member 5 are not directly fixed to each other.

The gap part 13 is secured between the finisher member 4 and the light guide member 5. For this reason, for example, when an occupant attaches a hand to the finisher member 4 such that external force F (see FIG. 4) from above acts on the finisher member 4, the external force F is transmitted (released) to the cup holder body 3 through the finisher-member fixing part 12. Accordingly, the external force F is absorbed first by the finisher member 4 and the cup holder body 3.

Then, when the finisher member 4 and the cup holder body 3 are deformed by the external force F, the deformation causes the light guide member 5 to be deformed wholly. Therefore, it is prevented that partial stress acts on the light guide member 5. As a result, the light guide member 5 is hardly affected by the external force F, and thus the breakage of the light guide member 5 can be effectively prevented.

The light guide member 5 is formed of transparent acrylic resin, polycarbonate resin, or the like, but the above-described structure is particularly effective, for example, to a case where the light guide member 5 is formed of breakable acrylic resin.

(2) The rising part 21 standing upward is provided on the outer peripheral side than a portion, which covers the light guide member 5, of the finisher member 4. The fixing boss part 22 corresponding to the finisher-member fixing part 12 is provided on the inside of the rising part 21. Accordingly, the external force F from above is easy to be applied to the rising part 21 on the outer peripheral side than the portion, which covers the light guide member 5, of the finisher member 4. When the external force F from the above acts on the rising part 21, the finisher member 4 is deformed in such a direction that the portion covering the light guide member 5 is lifted up with the fixing boss part 22 on the inside of the light guide member 5 as a fulcrum by a principle of lever. Therefore, the gap part 13 between the finisher member 4 and the light guide member 5 is largely opened, and thus the external force F acting on the light guide member 5 can become small.

Although the external force F from the upper side acts on the inner peripheral portion of the finisher member 4 and the like, so that the edge portion of the opening part 4a of the finisher member 4 abuts on the concave 5a of the inner peripheral surface of the light guide member 5, the edge portion of the opening part 4a of the finisher member 4 is deformed to be separated from the concave 5a of the inner peripheral surface of the light guide member 5 so that the external force F acting on the light guide member 5 is reduced.

(3) The penetration-preventing enlarged-diameter part 35 is provided in the vicinity of the insertion end part 33 of the light-incident part 31. Accordingly, even in a case where the liquid 34 such as beverage or rain water is transferred to the light-incident part 31 and flows toward the light source holder 36, the penetration-preventing enlarged-diameter part 35 inhibits the transfer of the liquid 34, and thus, it is possible to effectively prevent the liquid 34 from penetrating to the emission hole part 32. Thus, it can be prevented that the penetration of the liquid 34 causes the light source 6 to be broken down.

Hereinbefore, the example of the present invention has been described with reference to the drawings, but the example is merely an example of the present invention. Therefore, the present invention is not limited to any of the configurations of the example, and it is a matter of course that modification of the design and the like without departing from the spirit of the present invention is included in the present invention.

For example, in a case where each example includes a plurality of configurations, any possible combination of those configurations is of course included in the present invention even when there is no specific description. In a case where a plurality of examples and modified examples are disclosed as the present invention, any possible combination of the configurations covering those examples is of course included in the present invention even when there is no specific description.

The configuration illustrated in drawings is of course included in the present invention even when there is no specific description. In a case where the words "and/or the like" are used, those words are used to mean that the equivalent is included. In a case where the word such as "almost", "approximately", or "about" is used, the word is used to mean that what is within the commonsensically acceptable scope or accuracy is included in the present invention.

The present application claims priority from Japanese Patent Application No. 2014-110567 filed on May 28, 2014, the entire contents of which are hereby incorporated by reference. In addition, all references cited herein are incorporated as a whole.

DESCRIPTION OF REFERENCE NUMERALS AND SIGNS

1 cup holder
3 cup holder body
4 finisher member
5 light guide member
6 light source
11 light-guide-member installation part
12 finisher-member fixing part
13 gap part
21 rising part
22 fixing boss part
31 light-incident part
32 emission hole part
33 insertion end part
34 liquid
35 penetration-preventing enlarged-diameter part
36 light source holder
F external force

The invention claimed is:
1. A cup holder comprising:
a cup holder body which has a bottomed container shape and is capable of accommodating a beverage container;
a decorative finisher member which is installed in an upper edge portion of the cup holder body; and
a light guide member which is interposed between a lower portion of the finisher member and the upper edge portion of the cup holder body and is capable of illuminating an interior of the cup holder body with light from a light source, wherein:
a light-guide-member installation part in which the light guide member is installable, and a finisher-member fixing part to which the finisher member is fixable are provided in the cup holder body; and
the finisher-member fixing part fixes the finisher member to the cup holder body in a state where the finisher member is separated with a gap part from an upper side of the light guide member, wherein the gap part is configured as a void space located between the finisher member and the light guide member.
2. The cup holder according to claim 1, wherein:
a rising part is provided to stand upward on an outer peripheral side than a portion, which covers the light guide member, of the finisher member; and
a fixing boss part corresponding to the finisher-member fixing part is provided on an inside of the rising part.
3. The cup holder according to claim 1, wherein:
a light-incident part, to which the light is incident from the light source, protrudes from the light guide member;
the light-incident part serves as an insertion end part which is insertable to an emission hole part to which the light from the light source is emitted; and a penetration-preventing enlarged-diameter part which is capable of preventing liquid from penetrating to the emission hole part is provided in the vicinity of the insertion end part.

\* \* \* \* \*